Patented Aug. 20, 1940

2,212,155

UNITED STATES PATENT OFFICE 2,212,155

PROCESS FOR POLYMERIZING ETHYLENE

Linus Marvin Ellis, Wilmington, Del., assignor to E. I. du Pont de Nemours & Company, Wilmington, Del., a corporation of Delaware No Drawing. Application November 1, 1938, Serial No. 238,288

14 Claims. (Cl. 260—94)

This invention relates to processes for the polymerization of ethylene.

Ethylene has been polymerized under the influence of a variety of energizing influences, e. g. the silent electrical discharge, the use of alkyl radicals as catalysts, and the use of elevated temperatures and pressures both with and without the presence of catalytic agents. The conversion of ethylene to polymers which are solid at normal temperatures as described in British Patent 471,590 represents a case of the last type, in which extreme pressures and elevated temperatures are used.

This invention has as an object the provision of a process for the polymerization of ethylene to polymers which are solid at normal temperatures and which are waxy in feel like paraffin wax. A further object is the improvement in yield of useful products by the polymerization of ethylene. Other objects will appear hereinafter.

These objects are accomplished by the following invention wherein ethylene is polymerized by bringing it into contact with a hydrogenating catalyst and an alkali metal compound of general formula MR, wherein R is hydrogen or a hydrocarbon radical linked to the alkali metal through an aliphatic carbon atom, preferably in the presence of an inert organic solvent.

The more detailed practice of the invention is illustrated by the following examples, wherein parts given are by weight, unless otherwise stated. There are of course many forms of the invention other than these specific embodiments.

Example I

One-half part of an active hydrogenation catalyst composed of reduced nickel supported on kieselguhr is placed in a clean, dry steel pressure bomb. Air is displaced by dry nitrogen, and 189 parts of benzene solution containing 3.72 parts of n-butyllithium is siphoned into the bomb under an atmosphere of nitrogen. The bomb is sealed and agitated while being charged with ethylene to a pressure of 990 lbs./sq. in. The temperature of the bomb and contents rises to 48° C. upon introduction of the ethylene. Agitation is continued for six hours under a pressure maintained between 800 and 1010 lbs./sq. in. by occasional introduction of ethylene, which is added to a total of about 125 parts. During this time the temperature gradually drops to 35° C. The bomb is then allowed to stand for 16 hours, during which time the temperature drops to 22° C., and the pressure from 995 to 700 lbs./sq. in. The excess ethylene is then released, the bomb opened, and the semi-solid reaction product transferred to a flask containing about 500 parts of dilute (5%) hydrochloric acid. The volatile material present is removed by steam-distillation, and the residue air dried on a suction filter. There is thus obtained 36 parts of light grey solid. This is further purified by filtering a hot solution in xylene through "Filtercel," steam distilling off the xylene, and vacuum drying at an elevated temperature. The hard, brittle polymer thus obtained is pale yellow in color, melts at 106 to 110° C., has a waxy feel like paraffin wax, and gives a carbon-hydrogen analysis agreeing with the theoretical values for a hydrocarbon corresponding substantially in composition to $(CH_2)_n$.

The polymer is insoluble in cold solvents but generally soluble in hot hydrocarbon solvents having boiling points around or above its melting point, and shows a crystalline pattern when subjected to X-ray diffraction analysis.

In accord with its wax-like properties it is capable of taking a high polish when either in the form of a thin film or in bulk.

The hydrogenation catalyst used in the above example contains about 30 to 35% elementary nickel, the balance consisting principally of kieselguhr with small amounts of unreduced nickel oxide. To prepare this catalyst, 1700 parts of 6% sodium bicarbonate solution is added with agitation to 276 parts of 25% nickel nitrate solution containing 34 parts of kieselguhr in suspension. After thorough washing, the precipitate of basic nickel carbonate on kieselguhr thus obtained is reduced by hydrogen at 450 to 475° C., and the reduced catalyst stabilized by exposure at room temperature to an oxidizing atmosphere under such conditions that the temperature of the catalyst mass remains substantially constant at room temperature. When the above catalyst is replaced in the procedure of Example 1 by an active nickel catalyst prepared in accordance with methods described in U. S. Patents 1,563,987, 1,628,190 and 1,915,473 a somewhat smaller yield of similar polymer is obtained.

The benzene solution of n-butyllithium used in the above example is conveniently prepared by gradually adding n-butyl chloride (92 parts) with vigorous stirring to small chips of lithium metal (14 parts) suspended in warm benzene (900 parts) under an atmosphere of dry nitrogen.

When the polymerization of ethylene is attempted in the absence of a hydrogenating metal catalyst but otherwise as in Example 1 a yield of only 0.6 part of crude polymer is obtained.

Example II

Using the procedure described in Example 1, a steel pressure bomb is loaded with one-half part nickel-on-kieselguhr hydrogenation catalyst and 168 parts of benzene solution containing 8.22 parts n-butyllithium. The bomb is sealed and agitated while heated to 49° C., and charged with ethylene at 920 lbs./sq. in. The temperature is maintained at 50° C. for 7¼ hours, after which the bomb is recharged with ethylene and allowed to stand at room temperature for 8¼ hours. A considerable part of the pressure is then released, the bomb again agitated and heated to 125° C., charged with ethylene at 840 lbs./sq. in., and run at this temperature and pressure for 3¼ hours. When the product is removed and worked up as outlined under Example I, there is obtained 89.5 parts of polymer similar to that described in the first example.

Example III

Using the procedure described under Example I, a steel pressure bomb is loaded with ½ part of a nickel-on-kieselguhr hydrogenation catalyst and 181.2 parts of petroleum ether solution containing 21.6 parts of n-dodecyllithium prepared from 1-chlorododecane and lithium metal in accordance with the procedure given above for the preparation of n-butyllithium. After sealing, the bomb is shaken while being heated to 50° C. and charged with ethylene at 860 lbs./sq. in. pressure. The temperature is maintained at 50° C. for one hour, then at 80° C. for twenty minutes, and then at 50° C. for 7⅔ hours more, the pressure being held between 820 and 860 lbs./sq. in. during this time.

After standing under pressure at room temperature for an additional 8½ hours, the pressure is released and the contents removed and worked up as described under Example 1. There is obtained 12.3 parts of waxy solid melting between 75 and 80° C. which in physical appearance resembles paraffin wax, together with 22 parts of steam distillate having a boiling point higher than that of benzene.

Example IV

Using the procedure described in Example 1, a steel pressure bomb is loaded with one-half part of a nickel-on-kieselguhr hydrogenation catalyst and 178 parts of benzene solution containing 5.63 parts n-butyllithium. The bomb is sealed, shaken while being heated and charged with ethylene to a pressure of 400 lbs./sq. in., the temperature being maintained at 45 to 50° C. for seven hours, after which shaking was continued for nine hours with no external heating or replenishment of ethylene. During this time the temperature drops to 16° C., and the pressure to 200 lbs./sq. in. The quantity of ethylene introduced in this experiment is found to be 40 parts. The contents of the bomb are liquid, and give 18 parts of polymer upon removal of volatile material by steam distillation. The purified product melts at 90 to 95° C. and resembles soft, paraffin wax.

Example V

Using the procedure described in Example I, a steel pressure bomb is loaded with one-half part nickel-on-kieselguhr hydrogenation catalyst and 165 parts benzene solution containing 7.94 parts n-butyllithium. The bomb is sealed, shaken while being heated to 50° C., and charged with ethylene to a pressure of 2,000 lbs./sq. in. The temperature rises, due to heat of reaction, as high as 72° C. during the first half hour of the run. The run is continued for about seven hours, with occasional addition of ethylene to maintain pressure around 2,000 lbs./sq. in. The weight of ethylene added to the bomb in this instance is 125 parts. The weight of product recovered as described in Example I is 76 parts. The purified polymer melts at 118 to 119° C., but is otherwise similar to the product obtained according to Example I.

Example VI

Using the procedure described in Example I, a steel pressure bomb is loaded with one-half part of a nickel-on-kieselguhr hydrogenation catalyst and 160 parts of commercial heptane solution containing 2.92 parts of ethyllithium. The bomb is sealed, placed in a shaker, heated to 50° C., and charged with ethylene at 850 lbs./sq. in. pressure. After being run at the above temperature and pressure for seven hours, the bomb is allowed to stand under pressure without shaking or heating for 72 hours. After releasing the excess ethylene, the contents of the bomb are removed and dissolved with heating in about two volumes of xylene. The resulting solution is filtered hot through "Filtercel," and the volatile material steam distilled from the filtrate. The yield of purified residue obtained in this manner is 37 parts. This product is a waxy solid having a slight yellow color and melting at 112° C.

While lithium alkyls are preferred for use with the hydrogenating metal catalyst any alkali metal compound MR, wherein M is an alkali metal and R is hydrogen or a monovalent hydrocarbon radical joined to the alkali metal atom by aliphatic carbon, may be employed. The yield of polymer is generally better when alkyl lithium compounds are employed and these are therefore preferred in the practice of the invention. Instead of using a preformed lithium or other alkali metal alkyl, the correct proportions of lithium or other alkali metal and alkyl halide may be placed in the reaction bomb together with the inert solvent and the hydrogenation catalyst and the preparation of the alkali metal alkyl carried out either prior to, concurrently with, or subsequent to the addition of the ethylene. Instead of the lithium alkyls of the examples there may be used sodium or potassium alkyls and aralkyls, such as methylsodium, ethylsodium, butylsodium, isoamylsodium, dodecylsodium, benzylsodium, phenylisopropylsodium, phenylisopropylpotassium, etc. Instead of an alkali metal alkyl or aralkyl, we may use an alkali metal hydride with the inert solvent and hydrogenation catalyst, but generally with lower yields of polymer than are obtained with lithium alkyls. The alkali metal alkyls are preferred.

Although the use of a nickel catalyst is preferred, any hydrogenation catalyst including metallic and oxide hydrogenating catalysts may be used. Such catalytic metals and metal oxides include those from iron, cobalt, nickel, copper, manganese, silver, platinum, palladium, ruthenium, rhodium, and osmium. These catalysts may be used in an unsupported form, although the use of a suitable inert support generally increases the extent of active surface and consequently the catalytic activity.

Any inert organic solvent may be used. Aliphatic and aromatic hydrocarbons in general are suitable solvents for use in the process. It is necessary that these be inert with respect to any reaction which would destroy or render inactive the alkali metal compounds or the hydrogenation catalyst used in the polymerization. Although it is generally desirable to employ solvents which are relatively saturated in nature in order to assure uniformity of product, solvents containing olefinic hydrocarbons polymerizable by this process may also be used provided the types and proportions of such olefins present do not affect unfavorably the nature of the final products. It is generally preferred that the process be carried on in the presence of an inert organic solvent for practical reasons.

Although the temperature at which the process is carried out may be varied throughout the range in which the organo-alkali materials used in the polymerization remain at least temporarily stable, it is convenient in carrying out the polymerization with the preferred combination of a lithium alkyl solution and a nickel catalyst to work at temperatures not exceeding 140° C. In particular, in order to maintain ready control of the reaction it is preferable to initiate it at about 50° C. and to maintain the temperature between the limits of 50 and 100° C. during the first four to twelve hours of the run. The polymerization product is relatively insoluble in hydrocarbon solvents at temperatures below its melting point so that semi-solid reaction products are formed and agitation becomes relatively inefficient. An improvement in yield is obtained, as illustrated in Example II, by conducting the latter part of the polymerization at a temperature sufficiently elevated to keep the reaction mixture in a fluid condition. A similar result may be obtained by allowing the reaction mixture to stand under pressure at ordinary temperatures for a long period of time.

In the practice of this invention, pressures varying from atmospheric to the practical limits of the equipment may be employed, but it is generally preferred to carry out the polymerization at pressures in the range of 400 to 2,000 lbs./sq. in. and particularly in the range of 800 to 1100 lbs./sq. in., since pressures in this latter range may conveniently be obtained with commercial tank ethylene. The use of lower pressures in general leads to slower reaction, lower melting products, and lower yields of polymer. The use of higher pressure leads to faster reaction and higher yields of polymer melting in the neighborhood of 120° C.

The high melting wax-like polymer obtained from ethylene in accordance with the methods disclosed in the examples is compatible in 1:1 ratio with various other waxes such as carnauba wax, beeswax, Asiatic wax, Chinese insect wax, palm wax, stearic acid, spermaceti, candelilla wax, bayberry wax, Rilan wax, and hydrogenated oiticica oil. The ethylene polymer exerts a very pronounced effect in each case in raising the melting point of the blend above that of the pure wax with which it was mixed. The ethylene polymer is also apparently compatible with and plasticized by high molecular weight isobutylene polymers such as "Viskanol," blends of the ethylene polymer and "Viskanol" giving opaque, grayish white films which possess good adhesion to glass or steel, and having varying degrees of toughness and rubber-like flexibility depending on the proportions of the ingredients.

The ethylene polymer has been found to be a substitute for crude Montan wax for milling into rubber. It may be used as an ingredient of paste type shoe and automobile polishes, as a substitute for carnauba wax in carbon paper pastes, as an ingredient in the preparation of emulsion type waxes, and as a bullet lubricant.

The use of the hydrogenation catalyst in conjunction with the organo-alkali metal compound or alkali metal hydride yields highly advantageous results. For example, in the case of the polymerization of ethylene by solutions of lithium alkyls the yield is ordinarily 1% or less, based on the ethylene used, when the auxiliary catalyst is excluded. Yields of 60% or better are frequently obtained by the employment of the hydrogenating catalyst in conjunction with the lithium alkyl. Substituted ethylenes such as isobutylene are more readily polymerized than is ethylene by acid catalyst whereas the reverse is true in the polymerization of the present invention. Attempts to polymerize ethylene by heating to 200° C. under 2,000 lbs./sq. in. pressure in the presence of a nickel catalyst and tetraethyl lead in benzene solution gave low yields of tarry products. Since alkyl (ethyl) radicals would have been formed under the conditions of that experiment, the different nature of the product and the failure of catalytic nickel to produce any significant increase in yield indicates that the method of the present invention is not dependent on the pressure of alkyl radicals.

The above description and examples are intended to be illustrative only. Any modification of or variation therefrom which conforms to the spirit of the invention is intended to be included within the scope of the claims.

I claim:

1. Process which comprises bringing ethylene in contact with a hydrogenating catalyst and a member of the class consisting of alkali metal hydrides and alkali metal hydrocarbon compounds wherein a monovalent hydrocarbon radical is joined to the alkali metal through an aliphatic carbon atom.

2. Process which comprises bringing ethylene in contact with a hydrogenating catalyst and an alkali metal aralkyl.

3. Process which comprises bringing ethylene in contact with a hydrogenating catalyst and an alkali metal alkyl.

4. Process which comprises bringing ethylene in contact with a nickel catalyst and an alkali metal alkyl.

5. Process which comprises bringing ethylene in contact with a nickel catalyst and a lithium alkyl.

6. Process which comprises bringing ethylene in contact with a nickel catalyst and a lithium alkyl at 50–140° C. and a pressure of 400–2000 lbs. per square inch.

7. Process which comprises bringing ethylene in contact with a nickel catalyst and a lithium alkyl at 50–140° C. and a pressure of 800–1100 lbs. per square inch.

8. Process which comprises bringing ethylene in contact with a hydrogenating catalyst and an alkali metal alkyl at 400–2000 lbs./sq. in., conducting the reaction at 50–100° C. until at least semi-solid reaction products are obtained and thereafter conducting the reaction at a temperature sufficient to keep the reaction mixture in a fluid condition.

9. Process which comprises bringing ethylene in contact with a nickel catalyst and an alkali metal alkyl at 400–2000 lbs./sq. in., conducting the reaction at 50–100° C. until at least semi-solid reaction products are obtained and thereafter conducting the reaction at a temperature sufficient to keep the reaction mixture in a fluid condition.

10. Process which comprises bringing ethylene in contact with a nickel catalyst and a lithium alkyl at 400–2000 lbs./sq. in., conducting the reaction at 50–100° C. until at least semi-solid reaction products are obtained and thereafter conducting the reaction at a temperature sufficient to keep the reaction mixture in a fluid condition.

11. Process for producing at least semi-solid polymers from ethylene which comprises bringing ethylene in contact with a hydrogenating catalyst and an alkali metal alkyl at 400–2000 lbs./sq. in., conducting the reaction at 50–100° C. for from four to twelve hours and thereafter conducting the reaction at a temperature sufficient to keep the reaction mixture in a fluid condition.

12. Process for producing at least semi-solid polymers from ethylene which comprises bringing ethylene in contact with a nickel catalyst and an alkali metal alkyl at 400–2000 lbs./sq. in., conducting the reaction at 50–100° C. for from four to twelve hours and thereafter conducting the reaction at a temperature sufficient to keep the reaction mixture in a fluid condition.

13. Process for producing at least semi-solid polymers from ethylene which comprises bringing ethylene in contact with a nickel catalyst and a lithium alkyl at 400–2000 lbs./sq. in., conducting the reaction at 50–100° C. for from four to twelve hours and thereafter conducting the reaction at a temperature sufficient to keep the reaction mixture in a fluid condition.

14. Process which comprises bringing ethylene in contact with a hydrogenating catalyst and an alkali metal hydrocarbon compound wherein a monovalent hydrocarbon radical is joined to the alkali metal through an aliphatic carbon atom.

LINUS MARVIN ELLIS.

CERTIFICATE OF CORRECTION.

Patent No. 2,212,155.  August 20, 1940.

LINUS MARVIN ELLIS.

It is hereby certified that error appears in the printed specification of the above numbered patent requiring correction as follows: Page 3, second column, line 1, for "prepration" read --preparation--; line 27, for the word "pressure" read --presence--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.